United States Patent Office 3,687,611
Patented Aug. 29, 1972

3,687,611
CORROSION INHIBITION
Harold G. Liddell, Angleton, Tex., assignor to The Dow Chemical Company, Midland, Mich.
No Drawing. Filed Sept. 25, 1969, Ser. No. 861,184
Int. Cl. B27k 3/40; C23f 11/14
U.S. Cl. 21—2.7                                              4 Claims

ABSTRACT OF THE DISCLOSURE

A method for preventing corrosion of ferrous metals in contact with water, a phenolic compound and methylene chloride by maintaining in contact with said ferrous metal, water, phenolic compound and methylene chloride a small but effective amount of an amine selected from the group consisting of morpholine or an amine having the formula

wherein R represents an alkyl radical, a hydroxyl alkyl radical, an aminoalkyl radical or a cyclohexyl radical and R' and R" each represent H or an alkyl radical having from 2 to 8 carbon atoms.

BACKGROUND OF INVENTION

It was recently discovered that during the steaming cycle of wood to remove carriers used during the impregnation of the wood the metal in the treating cylinder is attacked by steam, the carriers and the treating agents causing corrosion of the ferrous metal. The corrosion products of the metal of the cylinder cause a discoloration of the wood which is undesirable since a clean natural light wood product is preferred. Therefore it is an object of the present invention to provide a method which will prevent the corrosion of the metal and thus alleviate the discoloration of the otherwise clean wood.

BRIEF DESCRIPTION OF INVENTION

It has now been found that the corrosion of ferrous metals in the presence of water, a polychlorophenol, and/or a chlorinated solvent can be inhibited by maintaining in contact with the metal and the aforementioned water, preservative and chlorinated solvent a small but effective amount, from about 0.05 to about 5% by weight based on the weight of the water, of an amine selected from the group consisting of morpholine or a compound having the formula

wherein R represents an alkyl radical, a hydroxy alkyl radical, an aminoalkyl or a cyclohexyl radical, and R' and R" each represent hydrogen or an alkyl radical having from 2 to 8 carbon atoms.

The inhibitor of the present invention is conveniently introduced into the treating cylinder as a solution in the steaming water.

DETAILED DESCRIPTION OF INVENTION

In accordance with the present invention, wood which has been impregnated with a polychlorinated phenol by immersion in a solution of the phenol in a chlorinated hydrocarbon solvent is steamed to remove the residual solvent remaining in the wood. Corrosion of the metal and discoloration of the wood is inhibited when the water employed to generate the steam contains from 0.05 to 5% by weight of morpholine or an amine having the formula

wherein R represents an alkyl radical, a hydroxy alkyl radical, an aminoalkyl or a cyclohexyl and R' and R" each represent hydrogen or an alkyl radical having from 2 to 8 carbon atoms. Amines which fall within the scope of the formula include monoethanolamine, monisopropanolamine, ethylenediamine, 2 - diethylaminoethanol, 2-ethylaminoethanol, 2-dimethylaminoethanol, tert-octylamine, 1,3-propanediamine, hexylamine and cyclohexylamine.

The amine may be added to the water neat or as a concentrated solution immediately prior to the start of the steaming cycle. It is preferred to not add the amine as a solution in the solvent since some reaction between the amine and solvent will occur if contact between the two chemicals is maintained for any protracted period of time.

The following description details a test under actual field conditions and sets forth a suitable operating procedure:

Example 1

Three ponderosa pine poles, twelve feet in length and 7–10" in diameter, were placed in a wood treating cylinder. These poles contained a total of 14.01 cubic feet of wood. The treating cylinder was closed, filled with a treating solution which consisted of 4.28% by weight pentachlorophenol dissolved in methylene chloride. Additional solution was pressured into the system by means of a hydraulic pressure pump. The pressurization was continued until the desired amount of solution had been impregnated in the poles. The excess solution was pumped from the treating cylinder to the storage tank. The poles were removed from the cylinder and were weighed to determine the amount of treating solution in them. A total of 194 lbs. of treating solution or an average of 13.85 lbs./cubic feet had been pressured into the wood.

After weighing, the poles were replaced in the cylinder, the cylinder closed and 273 lbs. of water and 0.955 lb. of monethanolamine were pumped into the cylinder. This developed a solution containing 0.35 wt. percent monoethanolamine in the water. The amount of solution was enough so that the steam coils in the bottom of the cylinder were completely covered.

The poles were then steamed to reclaim the methylene chloride. The steaming was stopped after 10 hours at which time 175.5 lbs. of methylene chloride (94.3% recovery) had been recovered. The poles were removed from the cylinder.

Eight mild steel (1010) coupons (½" x 2½" x 0.025") had been placed at various locations in the treating cylinder before the steaming cycle was started. After the steaming cycle, the coupons were removed, cleaned and weighed to obtain the corrosion rate and determine the effectiveness of the inhibitor. The following corrosion rate was obtained:

| Coupon No.: | Mils/yr. |
|---|---|
| 1 | 4.91 |
| 2 | 6.72 |
| 3 | 11.38 |
| 4 | 11.89 |
| 5 | 7.24 |
| 6 | 7.76 |
| 7 | 1.55 |
| 8 | 2.32 |
| Average corrosion rate | 6.73 |

The above average corrosion rate is much lower than the corrosion rates obtained in a control run employing approximately the same load of poles, cycle times and quantities of treating solution and steam, in which the monoethanolamine had been omitted. In this control test, the average corrosion rate of the eight coupons was 42 mils per year.

Example 2

A series of tests, conducted in glassware, was made to determine the extent of the corrosion and the effect of various compounds in inhibiting the corrosion.

The first series of tests illustrate the corrosive nature of water and pentachlorophenol.

To 225 grams of distilled water was added 0.56 gram of pentachlorophenol, 0.25 weight percent based on the water. Five such flasks were fitted with reflux condensers and a mild steel coupon with a surface area of 0.0017 square meter was suspended in each flask in a manner such that the coupons were entirely surrounded by the vapors which formed upon heating the flask and its contents to 100° C. The duration of the heating was four hours. The results of these tests are set out below:

| Flask No.: | Corrosion mils/year |
|---|---|
| 1 | 40.10 |
| 2 | 45.93 |
| 3 | 33.64 |
| 4 | 37.52 |
| 5 | 47.22 |
|  | 204.41 |
| Average | 40.88 |

Example 3

In another series of tests, four flasks were prepared each containing 225 grams of distilled water, 0.61 gram of pentachlorophenol and either .28 (flask 1) (flask 2), .21 (flask 3) or .14 (flask 4) grams of cyclohexylamine. The flasks and contents were heated to 100° C. while a slow current of air was bubbled through the liquid. The mild steel coupons were hung in the vapors. The flasks were weighed before and after the tests to insure no weight loss of liquid. The results of this series of tests are set forth below:

| Flask | Inhibitor | | Corrosion rate mils/year |
|---|---|---|---|
|  | Grams | Percent [1] |  |
| 1 | 0.28 | 0.125 | 1.29 |
| 2 | 0.28 | 0.125 | 1.93 |
| 3 | 0.21 | 0.093 | 3.88 |
| 4 | 0.14 | 0.0625 | 23.28 |

[1] Percent inhibitor based on water present.

This test illustrates that protection of the metal against corrosion is provided when an amount of as little as 0.0625% amine is employed.

Example 4

In a similar manner, other amines falling within the scope of the formula were tested employing 1% or 0.5% pentachlorophenol and various amounts of the named inhibitor. The corrosion rates of the metal coupons in mils per year are set forth below:

| Compound | Percent by wt. pentachlorophenol | Percent by wt. inhibitor | Corrosion rate, mils/year |
|---|---|---|---|
| Monoethanolamine | 0.5 | 0.25 | 0.7 |
|  | 1.0 | 0.25 | 4.8 |
|  | 0.5 | 0.185 | 18.5 |
|  | 1.0 | 0.185 | 24.7 |
|  | 0.5 | 0.125 | 27.5 |
| Monoisopropanolamine | 0.5 | 0.25 | 0.7 |
|  | 1.0 | 0.25 | 4.8 |
|  | 0.5 | 0.185 | 11.34 |
|  | 0.5 | 0.125 | 24.75 |
| Ethylenediamine | 0.5 | 0.25 | 0.68 |
|  | 1.0 | 0.25 | 1.37 |
| Diethylaminoethanol | 0.5 | 0.25 | 0.69 |
|  | 1.0 | 0.25 | 10.65 |
| 2-ethylaminoethanol | 0.5 | 0.25 | 0.7 |
|  | 1.0 | 0.25 | 11.0 |
| 2-dimethylaminoethanol | 0.5 | 0.25 | 0.7 |
|  | 1.0 | 0.25 | 12.37 |
| Tert-octylamine | 0.5 | 0.25 | 2.75 |
|  | 1.0 | 0.25 | 8.25 |
| 1,3-propanediamine | 0.5 | 0.25 | 4.12 |
|  | 1.0 | 0.25 | 8.93 |
| Hexylamine | 0.5 | 0.25 | 21.3 |
|  | 1.0 | 0.25 | 8.93 |
| Hexylamine | 0.5 | 0.25 | 21.3 |
|  | 1.0 | 0.25 | 24.0 |

I claim:

1. A method for preventing the corrosion of mild steel in contact with a corrosive medium containing water, pentachlorophenol and a halogenated hydrocarbon solvent for said pentachlorophenol which comprises maintaining in said corrosive medium a small but effective amount of morpholine or an amine having the formula $$RNR'\!\!\!\phantom{X}\atop R''$$

wherein R represents an alkyl radical, a hydroxy alkyl radical, an aminoalkyl or a cyclohexyl radical, and R' and R'' each represent hydrogen or an alkyl radical having from 2 to 8 carbon atoms.

2. The method of claim 1 wherein said amine is morpholine.

3. The method of claim 1 wherein said amine is monoethanolamine.

4. The method of claim 1 wherein said amine is cyclohexylamine.

References Cited

UNITED STATES PATENTS

| 1,996,717 | 4/1935 | Carlisle | 252—Solvent Digest |
| 2,053,024 | 9/1936 | Dreyfus | 21—2.7 |
| 2,096,735 | 10/1937 | Dinley | 21—2.5 UX |
| 2,512,949 | 6/1950 | Lieber | 21—2.5 |
| 2,562,549 | 7/1951 | Hatch | 21—2.7 UX |
| 2,582,138 | 1/1952 | Lane et al. | 21—2.7 X |
| 2,736,658 | 2/1956 | Pfohl et al. | 21—2.5 UX |
| 3,039,843 | 6/1962 | Chamberlain | 21—2.5 |
| 3,069,225 | 12/1962 | Anderson | 21—2.7 |
| 3,114,702 | 12/1963 | Thompson | 21—2.7 X |
| 3,382,186 | 5/1968 | Silverstein | 21—2.7 X |

FOREIGN PATENTS

| 519,730 | 12/1955 | Canada | 21—7 |

OTHER REFERENCES

Lindley, J.: "Halogenated Solvents"; Corrosion Technology; May 1964; pp. 26–30.

BARRY S. RICHMAN, Primary Examiner

U.S. Cl. X.R.

21—7